United States Patent [19]
Ma

[11] Patent Number: 6,092,512
[45] Date of Patent: Jul. 25, 2000

[54] INTERNAL COMBUSTION ENGINE

[75] Inventor: Thomas Tsoi-Hei Ma, Ferrets, United Kingdom

[73] Assignee: Ford Global Technologies, Inc., Dearborn, Mich.

[21] Appl. No.: 09/230,609

[22] PCT Filed: May 1, 1997

[86] PCT No.: PCT/GB97/01187

§ 371 Date: Jan. 26, 1999

§ 102(e) Date: Jan. 26, 1999

[87] PCT Pub. No.: WO98/04817

PCT Pub. Date: Feb. 5, 1998

[30] Foreign Application Priority Data

Jul. 26, 1996 [GB] United Kingdom .................. 9615768

[51] Int. Cl.⁷ ...................................................... F02B 47/00
[52] U.S. Cl. ....................................................... 123/568.15
[58] Field of Search .................... 123/568.15, 568.17, 123/FOR 124; 701/108

[56] References Cited

U.S. PATENT DOCUMENTS 3,894,520   7/1975   Clawson .................................. 123/531

FOREIGN PATENT DOCUMENTS 2545861   5/1977   Germany .
1172047   3/1999   Japan .
2313623   3/1997   United Kingdom .

*Primary Examiner*—Henry C. Yuen
*Assistant Examiner*—Hieu T. Vo
*Attorney, Agent, or Firm*—Jerome R. Drouillard

[57] ABSTRACT

A lean burn internal combustion engine includes an intake port. The intake port supplies an intake charge to the combustion chamber and exhaust gases are discharged through an exhaust port. Fuel is supplied by a fuel injector for dispersion within the air drawn into the combustion chamber by way of the intake port, and exhaust gases from the exhaust port are recirculated to the intake port without passing through the combustion chamber through an external EGR pipe. To promote lean burn and auto-ignition at low engine load, an additional fuel supply is provided in the EGR pipe for introducing fuel to be partially oxidised within the hot EGR gases before they enter the intake port.

22 Claims, 1 Drawing Sheet

INTERNAL COMBUSTION ENGINE

FIELD OF THE INVENTION

The present invention relates to an internal combustion engine that runs under lean burn and controlled auto-ignition combustion conditions during low load operation.

BACKGROUND OF THE INVENTION

Lean burn is known to give low fuel consumption and low $NO_x$ emissions. There is however a limit at which an engine can be operated with a lean air/fuel mixture because of misfire and combustion instability as a result of slow burn. Known methods to extend the lean limit include improving the ignitability of the mixture by enhancing the fuel preparation, for example using finely atomised fuel or vaporised fuel, and increasing the flame speed by introducing charge motion and turbulence in the air/fuel mixture. Finally, combustion by auto-ignition has been proposed for operating an engine with very lean air/fuel mixtures.

Controlled Auto-ignition Combustion has been given different names according to authors from various research activities world-wide including Homogeneous Charge Compression Ignition (Southwest Research Institute), Premixed Charge Compression Ignition (Toyota and VW), Active Radical Combustion (Honda), Fluid Dynamically Controlled Combustion (French Petroleum Institute), Active Thermo Combustion (Nippon Engines). As the various names imply, when certain conditions are met within a homogeneous charge of lean air/fuel mixture during low load operation, auto-ignition can occur wherein bulk combustion takes place initiated simultaneously from many ignition sites within the charge, resulting in very stable power output, very clean combustion and high thermal efficiency. $NO_x$ emission produced in controlled auto-ignition combustion is extremely low in comparison with spark ignition combustion based on a propagating flame front and heterogeneous charge compression ignition combustion based on an attached diffusion flame. In the latter two cases represented by today's well known spark ignition engine and diesel engine respectively, the burnt gas temperature is highly heterogeneous within the charge with very high local values creating high $NO_x$ emission. By contrast, in controlled auto-ignition combustion where the combustion is uniformly distributed throughout the charge from many ignition sites, the burnt gas temperature is substantially homogeneous with much lower local values resulting in very low $NO_x$ emission.

Engines operating under controlled auto-ignition combustion have already been successfully demonstrated in two-stroke gasoline engines using a conventional compression ratio. It iis believed that the high proportion of burnt gases remaining from the previous cycle, i.e. the residual content, within the two-stroke engine combustion chamber is responsible for providing the hot charge temperature and active fuel radicals necessary to promote auto-ignition in a very lean air/fuel mixture. In four-stroke engines, because the residual content is low, auto-ignition is more difficult to achieve, but can be induced by heating the intake air to a high temperature or by significantly increasing the compression ratio.

In all the above cases, the range of engine speeds and loads in which controlled auto-ignition combustion can be achieved is relatively narrow. The fuel used also has a significant effect on the operating range, for example, diesel fuel and methanol fuel have wider auto-ignition ranges than gasoline fuel.

OBJECT OF THE INVENTION

The present invention seeks to provide a lean burn engine capable of operating with very lean mixtures and to remain in the controlled auto-ignition combustion mode over a wide range of engine speeds and loads. This could improve fuel economy and meet $NO_x$ emission standard without relying on using a lean $NO_x$ catalyst or a lean $NO_x$ trap in the exhaust system of the engine.

SUMMARY OF THE INVENTION

According to the present invention, there is provided an internal combustion engine having an external exhaust gas recirculation (EGR) pipe for recirculating exhaust gases to the engine intake system and including means for metering fuel into the air drawn into the engine by way of the intake system, means for supplying additional fuel directly into the EGR pipe to be vaporised within the EGR pipe, and means for ensuring the presence of air in the EGR pipe during normal operation to mix with the fuel vapour in the EGR pipe, characterised in that the section of the EGR pipe lying between the point at which the fuel vapour is mixed with the air and the point at which the resulting mixture enters the intake system is of a length and temperature to enable a proportion of the fuel vapour to be oxidised thermally by the air in the said mixture to produce a substantial quantity of partial oxidation products in the EGR pipe, the concentration of partial oxidation products, when introduced into the overall combustible charge in the engine combustion chamber, being sufficient to cause controlled auto-ignition of at least part of the charge in the engine cylinders to occur over a wide range of engine loads and speeds thereby reducing by at least 10% the duration of combustion when the spark timing is optimised for best engine thermal efficiency at a given speed, load, air/fuel ratio and EGR dilution.

Preferably, the means for metering fuel into the air drawn into the engine by way of the intake system and the means for supplying fuel directly into the EGR pipe are jointly operative to supply a leaner than stoichiometric quantity of fuel in the combustible charge so as to ensure the presence of surplus air in the EGR gases. If desired, however, air may additionally be injected into the EGR pipe.

At typical temperatures of the EGR gases during lean burn low load operation, the rate of thermal oxidation of the fuel with the surplus oxygen in the EGR gases is relatively slow. Sufficient time must therefore be provided for the reaction process to take place in order for the partial oxidation products to be built up to useful amounts.

U.S. Pat. No. 3,894,520 describes an engine where fuel is introduced into a very short EGR connection between the exhaust and intake ports by way of an internal passage linking the two ports across the cylinder head.

GB-A-2,277,776 describes an engine where a fuel injector is used to spray fuel onto an EGR valve. As in conventional practice, the EGR valve is positioned in a cool position at the end of the EGR pipe near the intake port and the temperature is sufficiently low for the fuel injector to be mounted directly on the housing of the EGR valve.

In both cases, despite the fact that air may also be present in the EGR pipe, insufficient residence time is provided for the fuel in the EGR pipe to be oxidised to any appreciable amount before it is mixed with cold air in the intake system.

Vaporised fuel alone produced in the above prior art systems is in itself effective in improving ignition, but there is no provision for the production of partially oxidised fuel which is even more effective, to the extent that a sufficient concentration of such partial oxidation products could lead to auto-ignition independent of spark ignition.

The production of partial oxidation products and the attainment under certain operating conditions of auto-ignition are the key features of the present invention which are not anticipated in the above prior art systems. GB 0,770,814, GB-A-2,161,212 and U.S. Pat. No. 3,918,412 describe fuel cracking devices in the EGR pipe to reform the hydrocarbon fuel in the presence of carbon dioxide and steam into hydrogen and carbon monoxide. These references essentially exclude the presence of air from the EGR pipe because it would interfere with the fuel cracking process. Though GB-A-2,161,212 does mention that air may be present when the engine is first started or in conditions which might occur when there is insufficient heat in the recycled exhaust gases to achieve fuel cracking, air would not be used when the engine is running normally and the reference has no teaching relevant to controlled auto-ignition over a wide range of engine operation, for which the presence of air in the EGR pipe is essential if partial oxidation of the fuel is to take place.

It is advantageous in the present invention to provide a plasma reactor in the EGR pipe downstream of the additional fuel supply to ionise the gases and increase the rate of production of the partial oxidation products.

The production of partial oxidation products is a low temperature kinetics process (below 900° K) characterised by cool flame reaction in which the fuel molecules combine slowly with oxygen molecules forming partial oxidation products $CHO$, $CH_2O$, $CO$, $HO_2$, $H_2O_2$ etc. which are precursors to ignition. This is to be distinguished from the high temperature kinetics process (above 1000° K) characterised by combustion in which the fuel reacts rapidly with the oxygen accompanied by a spontaneous release of energy, i.e. the calorific heat of the fuel. The aim of the present invention is to make better use of the low temperature kinetics in order to assist ignition.

The increased presence of partial oxidation products in the combustible charge is beneficial for assisting ignition and flame propagation in a spark ignition lean burn engine and reducing the duration of combustion when the spark timing is set to optimise the efficiency of the engine at a given speed, load, air/fuel ratio and EGR dilution. When the concentration and the temperature of the partial oxidation products in the combustible charge are sufficiently high, auto-ignition takes place within the combustion charge.

Prior art systems aiming at achieving auto-ignition are described in technical papers published by the Society of Automotive Engineers: SAE 961160, SAE 960081, SAE 892068, SAE 830264. In these systems, fuel is dispersed within hot intake air in the air intake system to promote partial oxidation. Hot EGR gases or hot residual gases may be used to mix with the intake air to increase the temperature, but the time available for thermal oxidation of the fuel is inadequate except in a narrow range of engine operating conditions.

While these systems only disperse fuel in the intake air, the present invention takes advantage of the fact that the EGR gases in a lean burn engine also contain surplus oxygen and because of their elevated temperature, fuel dispersed within the EGR gases will start to produce partial oxidation products of the type produced by dispersing the fuel in hot intake air. Furthermore, by taking advantage of the transport time associated with the location of the supply of additional fuel in the EGR pipe, the time available for thermal oxidation of the fuel may be extended to several engine cycles.

The additional fuel supply into the EGR gases may be a carburettor mounted remotely from the hot EGR pipe and connected to a venturi in the EGR pipe for supplying a calibrated fuel flow into the venturi in proportion with the EGR gas flow. Alternatively the additional fuel supply may be a fuel injector mounted at the cool end of a fuel delivery pipe which is connected to the hot EGR pipe.

To reduce the cooling caused by evaporation of the fuel injected into the EGR gases, it is further advantageous to regulate the temperature of the fuel supplied to the fuel injector to maintain a predetermined fuel temperature just below the boiling point of the fuel corresponding to the pressure of the fuel within the fuel injector.

The EGR/fuel mixture containing partial oxidation products may be mixed with the intake air in the intake port to form a substantially homogeneous mixture. On the other hand, it is advantageous to separate and stratify the EGR gases from the intake air both outside and inside the combustion chamber during each intake period in order to maintain a substantially stratified charge within the combustion chamber at the end of the intake period. Subsequent to this, it is then even more advantageous to promote mixing between the EGR gases and air within the combustion chamber during each compression period in order to form a substantially homogeneous charge towards the end of the compression period.

It is preferred in the present invention to maintain the separation and stratification between the EGR/fuel mixture containing partial oxidation products and the intake air/fuel mixture both outside and inside the combustion chamber during the intake period. Only during the compression period after both mixtures have been compressed to sufficiently high temperatures in the cylinder should they be allowed to mix. Auto-ignition may take place either locally within the hot EGR/fuel mixture containing partial oxidation products while it is still stratified from the air/fuel mixture, or globally in the homogeneous charge after the EGR and air are mixed towards the end of the compression period.

The latter condition ensures that the timing of the auto-ignition is determined substantially by the time when the EGR/fuel mixture containing partial oxidation products and the air/fuel mixture are mixed towards the end of each compression period. This is an important improvement over the prior art systems where the timing of the auto-ignition was unpredictable, being broadly influenced by the temperature, mixture strength and dilution content of the combustible charge. In the present invention, the timing of the auto-ignition is known within a narrow range and can be further controlled within the range by varying the concentration of partial oxidation products when mixed with the combustible charge in the engine cylinder.

WO 95/22687 and British Pat. Appln. No. 9510491.5 describe methods of achieving gas stratification between the EGR gases and air within the combustion chamber. In these applications, the objective was to maintain gas stratification throughout the intake and compression periods and to ignite a stratified charge where air and fuel form an ignitable mixture in the vicinity of the spark plug and EGR gases are disposed in regions remote from the spark plug. In these cases it is obvious that the fuel must be dispersed within the air and not in the EGR gases in order to avoid misfire and incomplete combustion.

In the present invention, gas stratification is conserved only during the intake period and the charge is deliberately mixed to form a homogeneous mixture towards the end of each compression period. In this context, a combination of WO 95/22687 and/or GB 9510491.5 with the present invention will be effective in achieving the necessary gas stratification during the intake period.

In a preferred embodiment of the invention aimed at achieving gas stratification within the combustion chamber in a manner similar to that described in WO 95/22687, the design of the EGR supply into the intake port is such that, during the period when the intake valve is closed the EGR gases are drawn into the closed end of the intake port in the vicinity of the intake valve and are stored as a column within the intake port and its associated intake duct forming a stratified column with the air in the intake duct along the length of the intake duct, and during the period when the intake valve is open the stratified column is drawn in series into the cylinder to form a stratified charge within the combustion chamber.

In another embodiment of the invention aimed at achieving gas stratification within the combustion chamber in a manner similar to that described GB 9510491.5, the design of the EGR supply into the intake port is such that during at least part of each intake period the EGR gases and the intake air are drawn in parallel into the cylinder along separate channels in the intake port to form a stratified charge within the combustion chamber. The relative volumes of the gases flowing along the separate channels are kept constant while the engine load is varied in order to minimise mixing within the combustion chamber for a wide range of engine loads.

In the last step, the EGR/fuel mixture containing partial oxidation products and the intake air/fuel mixture are compressed and mixed to form a homogeneous charge within the combustion chamber towards the end of the compression period. During this process, the partial oxidation products contained within the EGR/fuel mixture is distributed uniformly throughout the combustible charge.

In order to promote mixing within the combustion chamber during the compression period, the intake port may be designed to produce tumble motion within the combustion chamber and the design of the combustion chamber may be such that the EGR gases and intake air, being stratified within the cylinder at the beginning of each compression period, are compressed and rapidly mixed when the tumble motion disintegrates towards the end of each compression period.

Alternatively, the piston may be designed to produce squish motion within the combustion chamber and the design of the combustion chamber may be such that the EGR gases and intake air, being stratified within the cylinder at the beginning of each compression period, are compressed and rapidly mixed when the squish motion intensifies towards the end of each compression period.

BRIEF DESCRIPTION OF THE DRAWINGS

The invention will now be described further, by way of example, with reference to the accompanying drawings, in which.

DETAILED DESCRIPTION OF THE PREFERRED EMBODIMENTS

Figure 1:
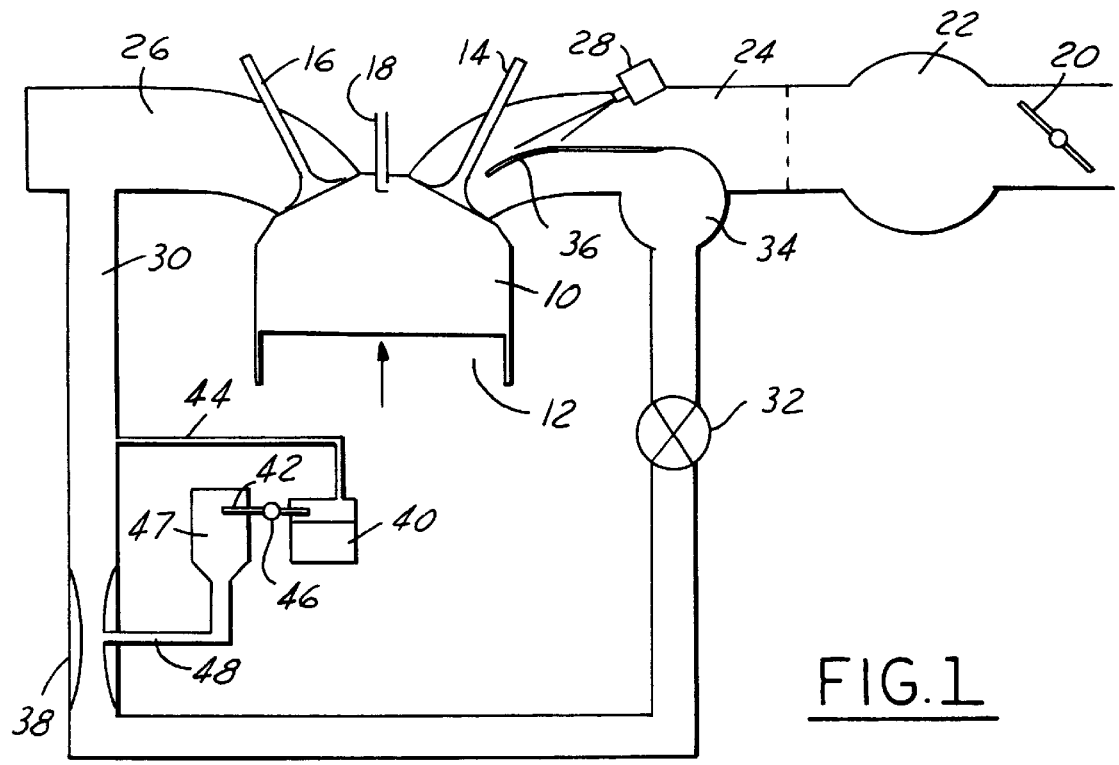
FIG. 1 is a schematic representation of an engine in accordance with a first embodiment of the invention.

In FIG. 1 there is shown a lean burn internal combustion engine having a piston 12 reciprocating within a cylinder to define a variable volume combustion chamber 10. The intake charge is ignited, at least under high load conditions, by a spark plug 18. Though as described below under certain conditions the engine is designed for auto-ignition to occur, this spark plug 18 is preferably fired under all conditions.

Ambient air is supplied to the combustion chamber by way of an intake manifold 22 having one branch that terminates in an intake port 24 controlled by an intake valve 14. The intake manifold 22 is connected to receive ambient air by way of a butterfly throttle 20 that sets the engine load. The intake port 24 is divided by a partition wall 36 into two channels, the air entering by way of the upper channel into which fuel is dispersed by a fuel injector 28. The lower channel is connected to a second manifold 34 which is itself connected by way of an external EGR pipe 30 to the exhaust system of the engine. The EGR pipe 30 is shown as being connected to the exhaust port 26 controlled by the exhaust valve 16 of the same cylinder in order that the EGR gases should be as hot as possible, but it can be connected further downstream in the exhaust system. A valve 32 is provided in the EGR pipe 30 to control the rate of EGR flow and to shut off the EGR flow at high engine loads.

In the present invention, in order to assist ignition and reduce the duration of combustion, fuel is introduced into the EGR pipe 30 to be partially oxidised within the hot EGR gases containing surplus air. In the embodiment of FIG. 1 the introduction of fuel is achieved by aspiration in a manner similar to a conventional carburettor. To this end a venturi 38 is arranged along the length of the EGR pipe 30 and is connected by a fuel delivery pipe 48 to a chamber 47. A fuel dispersing tube 42 feeds into the chamber 47 and is connected by a regulator 46 to a fuel reservoir 40 that is maintained at the static pressure in the EGR pipe by a gas line 44. The reduced dynamic pressure created within the venturi 38 by the flow of EGR gases draws fuel from the reservoir 40 at a rate that may be adjusted by the regulator 46, the latter being a fixed or variable orifice such as a needle valve.

Figure 2:
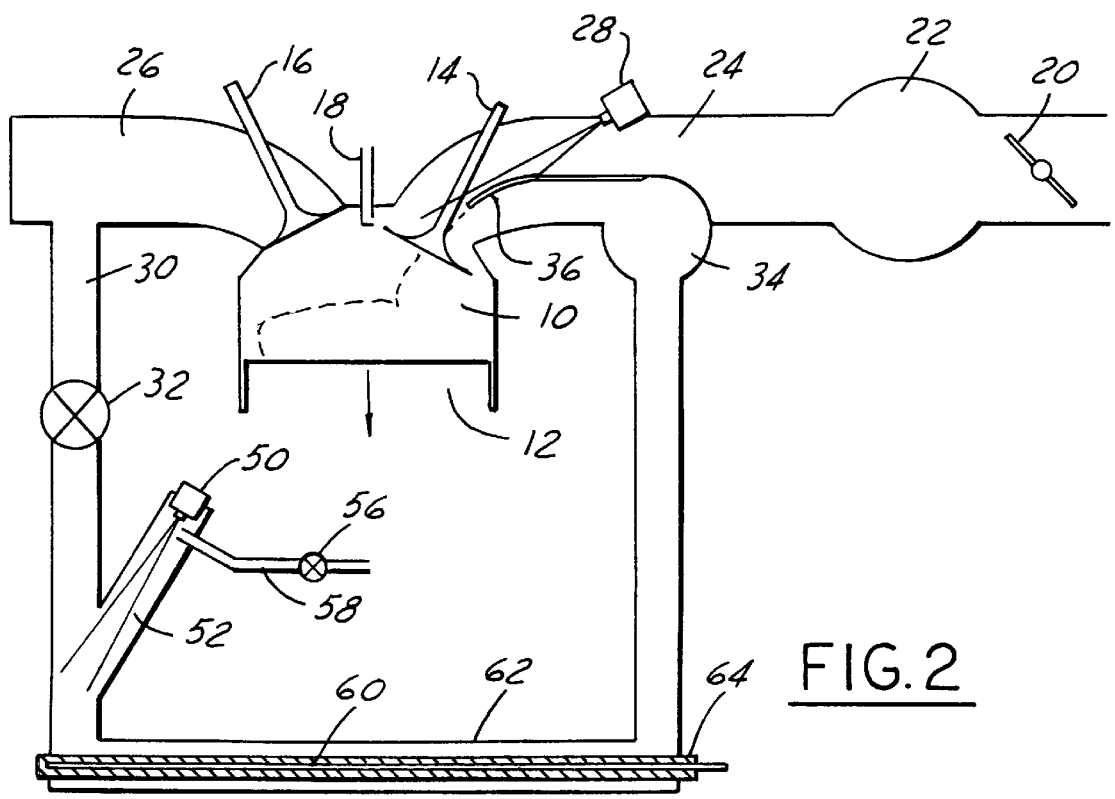
FIG. 2 is a similar representation of an alternative embodiment of the invention.

The embodiment of FIG. 2 differs from that of FIG. 1 in two respects. First, the carburettor arrangement is replaced by a fuel injector 50. The injector 50 feeds fuel into the EGR pipe 30 by way of a fuel delivery pipe 52 that extends tangentially to the EGR pipe 30 to promote vaporisation. The EGR valve 32 is positioned upstream of the fuel delivery pipe 52, the latter also being connected to an air supply line 58 that draws in ambient air through a regulator 56. The air drawn in by way of the regulator 56 can serve for idle speed control and is preferably introduced tangentially to the fuel delivery pipe 52 to assist in fuel dispersion. Second, a plasma reactor consisting of a high voltage wire 60 mounted in a porous dielectric barrier 64 in a section 62 of the EGR pipe 30 serves to ionise the gases and increase the production of partial oxidation products in the EGR/fuel mixture.

During operation of the embodiment of FIG. 1, the total quantity of fuel supplied to the engine both via the EGR gases and the fuel injector 28 is less than the quantity required for stoichiometry. Hence the engine is operated in a lean burn mode in which there is always surplus oxygen in the combustible charge and in the exhaust gases. The fuel introduced into the EGR gases can react with the hot surplus oxygen but the thermal reaction is a low temperature kinetics process and does not cause spontaneous combustion of the fuel. Instead a cool flame reaction takes place that produces partial oxidation products that are reintroduced into the combustion chamber via the EGR pipe 30.

To ensure that a sufficient quantity of partial oxidation products is produced, the section of the EGR pipe lying between the point at which the fuel vapour is mixed with the air and the point at which the said mixture enters the intake system, is of a length and temperature that enable a proportion of the fuel vapour to be oxidised thermally by the air in the said mixture to produce a substantial quantity of partial oxidation products in the EGR pipe.

When the EGR gases mixed with intake air are compressed and thereby heated during the compression stroke of the engine, the presence of partial oxidation products in the combustible charge increases the ignitability of the charge resulting in more robust spark ignition lean burn combustion. If enough partial oxidation products are present, the charge can auto-ignite by compression, without the assistance of a spark, when the appropriate temperature and pressure conditions occur in the combustion chamber.

Auto-ignition can occur in a conventional spark ignition engine unintentionally but because it is uncontrolled, steps are taken to avoid it. This phenomenon can cause knock at high engine loads resulting in what is termed pinking.

Though auto-ignition is undesirable at high load, at low loads it produces better combustion than spark ignition. The reason for this is that instead of a flame being initiated at the spark plug and propagating across the width of the combustion chamber, auto-ignition results in a simultaneous combustion initiated at many ignition sites resulting a more rapid and complete combustion and also in a more even temperature distribution within the charge. By avoiding excessively high local gas temperatures in this manner, the $NO_x$ emission is reduced.

In FIGS. 1 and 2, the control of the concentration of partial oxidation products in the EGR/fuel mixture permits auto-ignition to be achieved over a wide range of engine speeds and loads. The control can be effected by varying several parameters. First, the proportion of the fuel dispersed in the EGR gases can be increased. Second, the production of the partial oxidation products can be increased by increasing the exhaust gas temperature and by lagging the EGR pipe to prevent heat loss. Third, the rate of reaction between the fuel and the surplus oxygen in the EGR gases can be increased by preheating the fuel supplied to the EGR pipe. Fourth, energy can be supplied to the EGR/fuel mixture, for example electrical discharge energy of a low temperature plasma corona reactor of FIG. 2.

The described engine and intake system is also designed to retain the heat of the EGR gases containing partial oxidation products for as long as possible by resorting to charge stratification that maintains the hot EGR gases and the cold intake air separate until the end of the intake stroke. To this end, the intake port 24 is used in the manner shown in FIG. 1 as a storage port when the intake valve 14 is closed. In the drawings, the shaded area represents the EGR gases containing partial oxidation products and the unshaded areas intake air. While the intake valve 14 is closed, as shown in FIG. 1, there will be vacuum in the manifold 22 created by the induction stroke of one of the other cylinders of the engine and this will cause EGR gases to enter the intake port 24 via the lower channel and to accumulate in the upper channel as shown after having been turned around by the geometry of the intake port 24. Throughout this time no mixing has taken place between the EGR gases containing partial oxidation products and the intake air. When the intake valve 14 is opened at the commencement of the intake stroke, at first, the column of EGR gases is drawn in from the upper channel of the intake port 24 in parallel with the EGR gases of the lower channel and subsequently, as shown in FIG. 2, EGR gases are drawn into the lower part of the combustion chamber 10 from the lower channel of the intake port 24 while the intake air and fuel are drawn into the upper part of the combustion chamber 10. Therefore up to the commencement of the compression stroke, the EGR gases containing partial oxidation products and intake air are kept separate to prolong the time for the production of partial oxidation products within the EGR gases.

The geometry of the combustion chamber 10 is designed to create mixing during the compression stroke so that at the instant of ignition or spontaneous combustion near the end of the compression stroke, the charge is substantially homogeneous.

The effect of charge stratification is not merely to prolong the production time of the partial oxidation products fin the EGR gases, but more importantly it prevents premature spontaneous ignition by keeping the ignitable fuel away from an adequate supply of oxygen until near the end of the compression stroke when the mixing of the charge will allow auto-ignition to occur. In this way the timing of the auto-ignition is controlled by the time at which the gas streams are allowed to mix homogeneously rather than by the concentration of partial oxidation products averaged over the whole charge. Therefore a surplus of partial oxidation products can be produced to ensure robust lean burn ignition or auto-ignition while avoiding the risk of premature ignition.

What is claimed is:

1. An internal combustion engine having a combustion chamber, an intake system for drawing air into the engine, an exhaust system, and a first device for metering a first amount of fuel into the air drawn into the engine through the intake system, an external exhaust gas recirculation (EGR) pipe having a length, a first end connected to the exhaust system and a second end connected to the intake system for recirculating exhaust gases to the intake system, the engine comprising:

a second device for supplying a second amount of fuel into the EGR pipe at a point along the length of the EGR pipe, the second amount of fuel being vaporised within the EGR pipe;

a third device for introducing air in the EGR pipe during normal engine operation to mix with the fuel being vaporised in the EGR pipe to form an air/fuel mixture; and the EGR pipe having a second length between the point at which the fuel being vaporised is mixed with the air and the second end thereof, the second length being sufficient to enable a proportion of the fuel vapour to be oxidised thermally by the air in said mixture to produce a substantial quantity of partial oxidation products in the EGR pipe, the quantity of partial oxidation products, when introduced into overall combustible charge in the engine combustion chamber, being sufficient to cause controlled auto-ignition of at least part of the charge in the combustion chamber to occur over a wide range of engine loads and speeds, thereby reducing by at least 10% the duration of combustion when spark timing is optimised for best engine thermal efficiency at a given speed, load, air/fuel ratio and EGR dilution.

2. An internal combustion engine as claimed in claim 1, wherein the device for metering fuel into the air drawn into the engine by way of the intake system and the device for supplying fuel directly into the EGR pipe are jointly operative to supply a leaner than orstoichiometric quantity of fuel in the combustible charge so as to ensure the presence of surplus air in the EGR gases.

3. An internal combustion engine as claimed in claim 2, wherein air is injected into the EGR pipe.

4. An internal combustion engine as claimed in claim 3, wherein a plasma reactor is provided in the EGR pipe downstream of the point at which the fuel vapour is mixed with the air to ionise the gases in said mixture and increase the rate of production of partial oxidation products.

5. An internal combustion engine as claimed in claim 4, wherein a fourth device is provided to retard the ignition timing of the engine later than top dead center of the engine in order to increase the temperature of the EGR gases and the rate of production of partial oxidation products, the fourth device operative during idle operating conditions immediately after a cold start.

6. An internal combustion engine as claimed in claim 1, wherein a plasma reactor is provided in the EGR pipe downstream of the point at which the fuel vapour is mixed with the air to ionise the gases in said mixture and increase the ratio of production of partial oxidation products.

7. An internal combustion engine as claimed in claim 6, wherein the partial oxidation products in the EGR gases, when mixed within the combustible charge in the engine cylinder, are in sufficient concentration to cause auto-ignition of the charge by compression.

8. An internal combustion engine as claimed in claim 1, wherein a fourth device is provided to retard the ignition timing of the engine later than top dead center of the engine in order to increase the temperature of the EGR gases and the rate of production of partial oxidation products, the fourth device operative during idle operating conditions immediately after a cold start.

9. An internal combustion engine as claimed in claim 1, wherein the device supplying additional fuel into the EGR pipe comprises a carburetor having a fuel reservoir mounted remotely from the EGR pipe and a fuel dispersing tube connected to a venturi in the EGR pipe for supplying a calibrated flow of additional fuel into the venturi in proportion with the velocity of the flow of EGR gases through the venturi.

10. An internal combustion engine as claimed in claim 1, wherein said device supplying additional fuel into the EGR pipe comprises a fuel injector mounted at a cool end of a fuel delivery pipe remote from the EGR pipe and connected to the EGR pipe at the other end of the fuel delivery pipe.

11. An internal combustion engine as claimed in claim 10, wherein the partial oxidation products in the EGR gases, when mixed within the combustible charge in the engine cylinder, are in sufficient concentration to cause auto-ignition of the charge by compression.

12. An internal combustion engine as claimed in claim 11, wherein the timing of the auto-ignition is varied by varying the concentration of partial oxidation products in the EGR gases when mixed within the combustible charge in the engine cylinder.

13. An internal combustion engine as claimed in claim 12, further comprising a fifth device to separate the EGR gases containing partial oxidation products from the intake air both outside and inside the combustion chamber during each intake period of the engine cylinder in order to maintain a substantially stratified charge within the combustion chamber at the end of an intake period.

14. An internal combustion engine as claimed in claim 12, further comprising a sixth device to promote mixing between the EGR gases and air within the combustion chamber during each compression period of the engine cylinder in order to form a substantially homogeneous charge towards the end of a compression period.

15. An internal combustion engine as claimed in claim 14, wherein EGR gases are drawn into the intake port in the vicinity of the intake port and are stored as a column within the intake port and an associated intake duct forming a stratified column with the air in the intake duct along a length of the intake duct when the intake valve is closed, and when the intake valve is open the stratified column is drawn in series into the cylinder to form a stratified charge within the combustion chamber.

16. An internal combustion engine as claimed in claim 15, wherein the EGR gases and the intake air are drawn in parallel into the combustion chamber along separate channels in the intake port to form a stratified charge within the combustion chamber, the relative volumes of the gases flowing along the separate channels being kept constant while the engine load is varied in order to minimize mixing within the combustion chamber for a wide range of engine loads.

17. An internal combustion engine as claimed in claim 16, wherein the intake port produces tumble motion within the combustion chamber and the EGR gases and intake air, are stratified within the combustion chamber at the beginning of a compression period, are compressed and rapidly mixed when the tumble motion disintegrates toward the end of the compression period.

18. An internal combustion engine as claimed in claim 17, wherein a piston produces squish motion within the combustion chamber and the EGR gases and intake air are stratified within the cylinder at the beginning of the compression period, are compressed and rapidly mixed when the squish motion intensifies toward the end of the compression period.

19. An internal combustion engine as claimed in claim 12, wherein EGR gases are drawn into the intake port in the vicinity of the intake port and are stored as a column within the intake port and an associated intake duct forming a stratified column with the air in the intake duct along a length of the intake duct when the intake valve is closed, and when the intake valve is open the stratified column is drawn in series into the cylinder to form a stratified charge within the combustion chamber.

20. An internal combustion engine as claimed in claim 1, further comprising a fifth device to separate the EGR gases containing partial oxidation products from the intake air both outside and inside the combustion chamber during each intake period of the engine cylinder in order to maintain a substantially stratified charge within the combustion chamber at the end of an intake period.

21. An internal combustion engine as claimed in claim 1, wherein the partial oxidation products in the EGR gases, when mixed within the combustible charge in the engine cylinder, are in sufficient concentration to cause auto-ignition of the charge by compression.

22. An internal combustion engine as claimed in claim 21, wherein the timing of the auto-ignition is varied by varying the concentration of partial oxidation products in the EGR gases when mixed within the combustible charge in the engine cylinder. compression period.

* * * * *